United States Patent [19]
Nozik et al.

[11] 3,987,780
[45] Oct. 26, 1976

[54] GREENHOUSE WINDOW FOR SOLAR HEAT ABSORBING SYSTEMS DERIVED FROM $Cd_2SnO_4$

[75] Inventors: Arthur Jack Nozik, Westport; Gottfried Haacke, Stamford, both of Conn.

[73] Assignee: American Cyanamid Company, Stamford, Conn.

[22] Filed: Mar. 3, 1975

[21] Appl. No.: 554,370

[52] U.S. Cl. .................. 126/271; 350/1; 428/335
[51] Int. Cl.² ............................ F25J 3/02
[58] Field of Search ............ 126/270, 271; 60/641; 136/89; 350/1; 117/33.3

[56] References Cited
UNITED STATES PATENTS

| | | | |
|---|---|---|---|
| 1,946,184 | 2/1934 | Abbot | 126/271 |
| 3,811,953 | 5/1974 | Nozik | 136/89 |

Primary Examiner—William O'Dea
Assistant Examiner—Ronald C. Capossela
Attorney, Agent, or Firm—John L. Sullivan

[57] ABSTRACT

Cadmium stannate has been found to be useful as a window for solar heat absorbing systems in which advantage is taken of the unique optical properties of cadmium stannate. When cadmium stannate is in an electrically conductive state, having a conductivity of greater than $10^3 ohm^{-1} cm^{-1}$, it becomes transparent to solar radiation and reflective of thermal infrared radiation. This enables the cadmium stannate to function as a window which allows passage of solar radiation through it and incident onto a black body, and at the same time serve as a reflector of thermal infrared radiation emitted from said body. This results in more efficient solar heat transfer to the solar heat collector provided with such a window.

1 Claim, 2 Drawing Figures

GREENHOUSE WINDOW FOR SOLAR HEAT ABSORBING SYSTEMS DERIVED FROM $CD_2SNO_4$

BACKGROUND OF THE INVENTION

Realization that the fossil fuel supply of the United States is finite and may be rapidly depleted if the projected growth rate of national energy consumption continues has led to a search for substitute energy sources. Among a number of yet unexploited resources, those which have the least adverse environmental impact and are independent of foreign supplied deserve the most attention. Utilization of solar radiation is one of the possibilities for satisfying part of the nation's need for clean and reliable energy.

The direct conversion of sunlight into electricity by photovoltaic cells or its collection by heat collectors are proven techniques of solar energy utilization. They are now used in specialized applications where cost is not of importance. To be useful on a large scale, in competition with existing energy sources, the development of technology is needed to enable the economic production of efficient photovoltaic cells and solar heat collectors.

The combination of high optical transparency and high electrical conductivity exhibited by cadmium stannate ($Cd_2SnO_4$) can be exploited for use as transparent electrodes in photovoltaic cells. This is fully discussed in a copending United States Patent Application, Ser. No. 181,916 and in a paper published in Physical Review, Vol. 6, No. 2, pp 453–59 dated July 15, 1972, entitled: "Optical and Electrical Properties of $Cd_2SnO_4$: A Defect Semiconductor," by A. J. Nozik.

Utilization of solar energy for space heating or air conditioning (absorption refrigeration) by collecting solar radiation in heat collectors has been suggested in a number of publications, including: Physics Today, Vol. 25, pp 44–49 of February 1972; Natural Resources J. Vol. 10, 268–326 (1970); Solar Energy, Vol. 13, pp 395–401 (1972); and, Technical Report AFML-TR-70-294, pp 21–44 of January 1971. In the referenced Physics Today article, it has also been proposed to use solar heat collectors in large-scale solar "farms" and to operate conventional central power stations with the collected heat.

Two types of solar heat collectors are under consideration, flat-plate collectors and pipe collectors. In flat-plate collectors, unconcentrated solar energy is absorbed by flat plates; pipe collectors absorb sunlight which has been concentrated by suitable lenses and mirrors. The light absorbing element in both devices is a coating with a large optical absorption coefficient, $\alpha$, over most of the solar spectrum. The collection efficiency depends on $\alpha$ and on heat losses, which consist of convection, conduction and radiation losses. Convection and conduction losses can be eliminated by placing the collecting surface in a vacuum. Radiation losses consist of infrared radiation and are temperature dependent, becoming more severe with increasing operating temperature of the collecting surface. These losses can be minimized by using selective absorber surfaces which have a large $\alpha$ for sunlight but a small emissivity, $\epsilon$, for heat radiation. Such surfaces are feasible, and in fact have been prepared since the solar spectrum and the heat radiation spectrum (up to at least 600° C.) have little overlap — See J. Opt. soc. Am. 46, 31 (1956) and Technical Rept. AFML-TR-65-317 (October 1965).

Further reduction of radiation losses can be achieved by a greenhouse window coating deposited adjacent to the solar heat absorbing surface. The requirements for this coating are high transmittance for the incident solar radiation and high reflectance for heat radiation escaping from the absorber surface. These requirements are met by electrically conductive films of $Cd_2SnO_4$ having a conductivity greater than $10^3$ ohm$^{-1}$ cm$^{-1}$. These films can be readily formed by the radiofrequency sputtering technique described in a copending U.S. Pat. Application, Ser. No. 181,916, filed Sept. 20, 1971, now U.S. Pat. No. 3,811,953 or by chemical spraying methods wherein a solution of cadmium and tin bromides in the presence of $H_2O_2$ and $O_2$ is sprayed onto hot substrates at 400° to 1000° C.

The available heat flux from solar heat collectors, consisting of black body absorbers and greenhouse windows or of selective absorbers and greenhouse windows, is a function of solar concentration and absorber temperature. For high solar concentrations (> 10) and absorber temperatures below 500° C., it has been shown in Technical Report AFML-TR-70-294 that a greenhouse window does not add to the available heat flux. However, for lower solar concentrations, the addition of a greenhouse window contributes significantly to the available heat flux. Obviously, these investigations show that the highest heat flux contribution of a greenhouse window coating can be realized in flat-plate collectors and in pipe collectors which work at high operating temperatures.

Unfortunately, the solar heat collectors as presently known do not provide for highly efficient heat collection. This lack of efficiency relates primarily to the re-radiating of substantial amounts of infrared thermal energy by the heat collecting surface.

It is an object of this invention to provide a solar heat collector of improved efficiency.

It is a further object of this invention to provide a solar heat collector having a greenhouse window which increases the heat flux available to the heat collecting system of a solar energy converter.

Other objects and attendant advantages of the present invention will be apparent from the description thereof taken in connection with the accompanying drawings. The invention is capable of a variety of mechanical expressions, two of which are illustrated in the accompanying drawings. Therefore, it is to be expressly understood that the drawings are for the purpose of illustration only, and are not intended to present the full scope of the invention which is defined by the appended claims.

SUMMARY OF THE INVENTION

In accordance with the present invention, there is provided an article comprising cadmium stannate films having the properties of high solar transmissivity, electrical conductivity and thermal infrared reflectivity positioned adjacent to a body having a high absorptivity for solar radiation, said body having heat transfer means attached thereto whereby thermal energy in said body is dissipated therefrom as useful energy. In preferred embodiments there are provided heat collectors in two types of structures. In one the cadmium stannate is contiguous with said body; and is directly supported by it. In another type the cadmium stannate is separated from said body by a barrier to thermal conduction and convection, for example, an evacuated space and is supported on a second substrate, said substrate itself having high solar transmittance.

In accordance with the present invention the cadmium stannate layer has a thickness of from 300A to three microns, an electrical conductivity greater than $10^3 ohm^{-1} cm^{-1}$, and is preferably of crystalline phase. It also has a reflectivity greater than 50% for radiation with wavelengths greater than 3 microns, and preferably a reflectivity of greater than 90% for radiation with wavelengths in excess of 2 microns.

The transmissitivity of the $Cd_2SnO_4$ layer is at least 50% for radiation with wavelengths between 0.45 and 1.0 microns, and is preferably 95% for radiation with wavelengths between 0.45 and 1.0 microns. The average transmissivity of the $Cd_2SnO_4$ layer over the wavelength region 1.0 to 1.5 micron is greater than 25%, and is preferably about 80%. Control of the transmissivity is achieved by controlling the thickness of the $Cd_2SnO_4$ layer.

BRIEF DESCRIPTION OF THE DRAWINGS

In the accompanying drawings, wherein like characters designate corresponding parts throughout the several figures.

DESCRIPTION OF THE INVENTION

Figure 1:
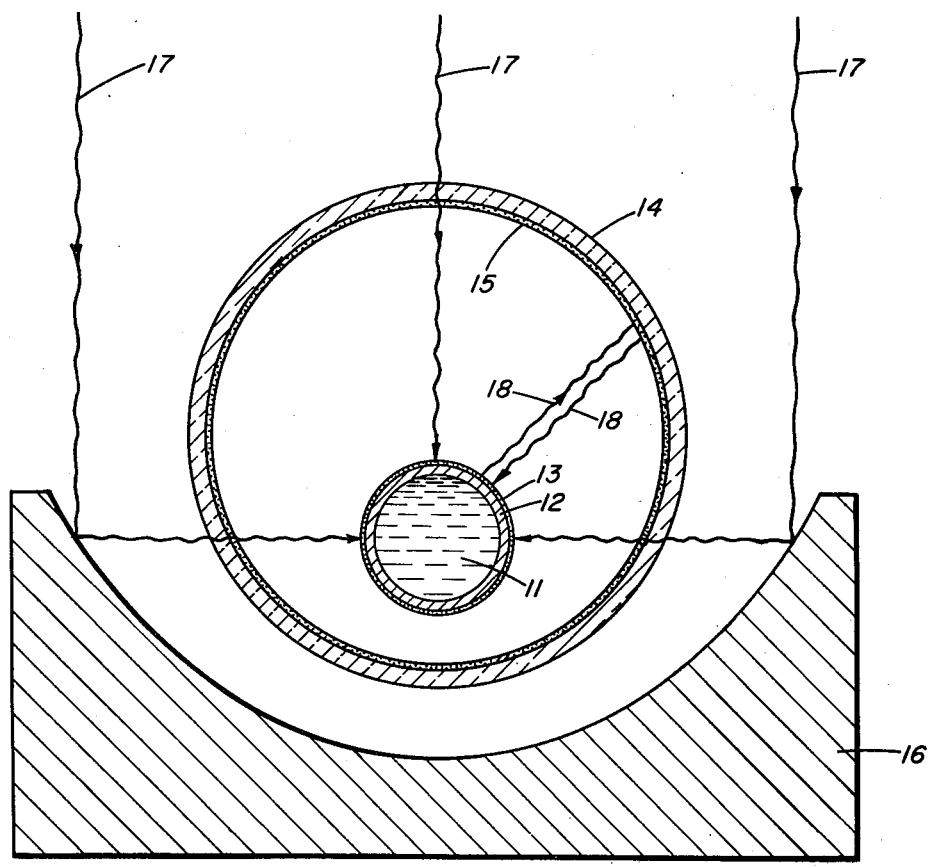
FIG. 1 is a schematic cross-sectional representation of a solar energy collecting element adapted for use in a pipe-type heat collector.

In FIG. 1, the heat transfer fluid 11 is flowing through a steel pipe 12 which is covered on its outer surface with a black coating 13 having a high absorptivity for solar radiation. The steel pipe 12 is located within an evacuated glass pipe 14 which has a coating of cadmium stannate 15 on its inner surface. The glass pipe 14 is positioned such that the inner steel pipe 12 is located at the focal point of a parabolic reflecting trough 16. Sunlight 17 impinging on the glass pipe and/or reflecting trough is absorbed by the black coating 13, and the solar thermal energy is thus transferred to the fluid 11. Infrared radiation 18 emitted by the hot surface 13 is reflected back into the system, resulting in more efficient solar heat transfer.

Figure 2:
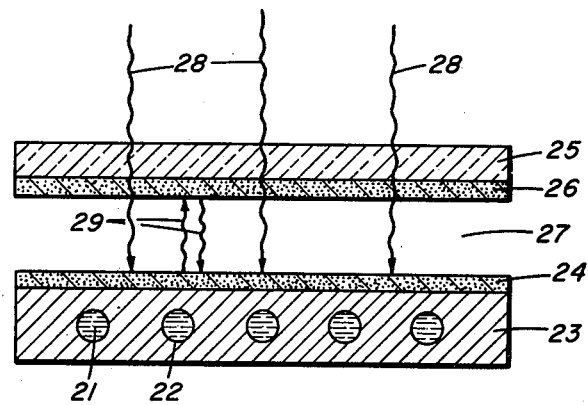
FIG. 2 is a schematic cross-sectional representation of a planar heat collecting element adapted for use in a flat panel type heat collector.

In FIG. 2, heat transfer fluid 21 is flowing through internal channels 22 located inside flat aluminum panels 23. A black coating 24 having a high absorptivity for solar radiation is painted on top of the aluminum panel 23. A glass panel 25 having a coating of cadmium stannate 26 on its inner surface is separated from the aluminum panel 23 by an air gap 27. The cadmium stannate layer 26 has a high transmittance for solar energy 28 and a high reflectance for thermal infrared radiation 29, so that the thermal energy 28 is effectively trapped in the black coating 24 and transferred to the fluid 21.

EXAMPLE I

A 40% (wt. basis) aqueous solution of $SnBr_4$ is mixed with a 30% (wt. basis) aqueous solution $CdBr_2$ such that the final solution contains Cd and Sn in the molar ratio of 2:1. A 30% solution of hydrogen peroxide is then added in an amount equal to one-half of the volume of the mixed Cd-Sn solution. The resulting solution is then immediately sprayed as a fine mist onto a quartz substrate maintained at 950° C., using an oxygen atomizing spray nozzle. A crystalline film of cadmium stannate is formed on the substrate and it exhibits high transmittance for solar radiation and high reflectance for thermal infrared radiation. These optical properties are further enhanced by placing the cadmium stannate coated quartz in a $H_2$ atmosphere at 280° C. for 10 minutes.

EXAMPLE II

The same procedure is followed as is described in Example I, except that glass is used as the substrate and the substrate temperature is maintained at 600° C. The resulting cadmium stannate film is amorphous rather than crystalline.

EXAMPLE III

A glass pipe is coated on the inner surface with a 3 micron film of $Cd_2SnO_4$ by the procedure described in Example II. A steel pipe is coated on its outer surface with a highly absorbing black paint and then located within the glass pipe. The glass pipe is evacuated and sealed to maintain a pressure of about $10^{-6}$ torr. The glass pipe is then positioned in a parabolic reflecting trough such that the inner steel pipe is located at the focal point of the parabolic mirror. A heat-transfer fluid is pumped through the steel pipe. Irradiation of the ensemble with sunlight results in efficient transfer of solar thermal energy to the heat-transfer fluid.

EXAMPLE IV

Same as Example II except that the $Cd_2SnO_4$ film is deposited directly on the coated steel pipe.

EXAMPLE V

An aluminum panel with internal channels interconnected to provide a torturous path for the flow of a heat-transfer fluid is coated on its outer surface with highly absorbing black paint. A flat panel of glass is coated with a 0.3 micron film of cadmium stannate by the method described in Example I, and placed adjacent to the aluminum panel, but separated by an air gap. Irradiation of the ensemble with sunlight results in highly efficient transfer of solar thermal energy to the heat-transfer fluid flowing through the channels of the aluminum panel.

EXAMPLE VI

Same as Example IV, except that the air gap is evacuated to a pressure of about $10^{-6}$ torr., and the system sealed to maintain the vacuum.

We claim:

1. A solar heat collector comprising an evacuated glass pipe having a layer of cadmium stannate with the properties of high transmittance for solar radiation and high reflectance for thermal radiation on its inner wall, said glass pipe surrounding a steel pipe which has its outer surface coated with a material having a high absorptivity for solar radiation, said steel pipe having a heat transfer fluid flowing through it, whereby solar energy absorbed by said material is withdrawn therefrom as useful energy; and said steel pipe being located at the focal point of a parabolic reflecting trough in which the evacuated glass pipe is positioned.

* * * * *